United States Patent
Yi et al.

(10) Patent No.: US 7,840,408 B2
(45) Date of Patent: Nov. 23, 2010

(54) DURATION PREDICTION MODELING IN SPEECH SYNTHESIS

(75) Inventors: Lifu Yi, Beijing (CN); Jie Hao, Beijing (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 1070 days.

(21) Appl. No.: 11/551,025

(22) Filed: Oct. 19, 2006

(65) Prior Publication Data

US 2007/0129948 A1  Jun. 7, 2007

(30) Foreign Application Priority Data

Oct. 20, 2005  (CN) .................. 2005 1 0114320

(51) Int. Cl.
G10L 13/00 (2006.01)
G10L 13/06 (2006.01)
(52) U.S. Cl. .................. 704/258; 704/266; 704/267
(58) Field of Classification Search ............... 704/258, 704/260, 266, 267
See application file for complete search history.

(56) References Cited

U.S. PATENT DOCUMENTS

| | | | | |
|---|---|---|---|---|
| 5,561,421 | A * | 10/1996 | Smith et al. | 341/51 |
| 5,682,501 | A * | 10/1997 | Sharman | 704/260 |
| 6,038,533 | A * | 3/2000 | Buchsbaum et al. | 704/260 |
| 6,064,960 | A * | 5/2000 | Bellegarda et al. | 704/260 |
| 6,778,960 | B2 * | 8/2004 | Fukada | 704/260 |
| 6,810,378 | B2 * | 10/2004 | Kochanski et al. | 704/258 |
| 6,813,604 | B1 * | 11/2004 | Shih et al. | 704/260 |
| 6,934,650 | B2 * | 8/2005 | Yoshida et al. | 702/76 |
| 7,089,186 | B2 * | 8/2006 | Fukada | 704/258 |
| 7,412,377 | B2 * | 8/2008 | Monkowski | 704/206 |
| 7,457,748 | B2 * | 11/2008 | Nefti et al. | 704/240 |
| 7,643,990 | B1 * | 1/2010 | Bellegarda | 704/211 |
| 2002/0165681 | A1 * | 11/2002 | Yoshida et al. | 702/76 |
| 2004/0083102 | A1 * | 4/2004 | Nefti et al. | 704/240 |

(Continued)

OTHER PUBLICATIONS

"An RNN-Based Prosodic Information Synthesizer for Mandarin Text-to-Speech," Sin-Horng Chen, et al., IEEE Transactions on Speech and Audio Processing, vol. 6, No. 3, May 1998, pp. 226-239.
"Polynomial Regression Model for Duration Prediction in Mandarin," Sun Lu, et al., Iflytek Speech Laboratory, University of Science and Technology of China, 4 pages, Interspeech 2004, pp. 769 to 777.

(Continued)

*Primary Examiner*—Martin Lerner
(74) *Attorney, Agent, or Firm*—Oblon, Spivak, McClelland, Maier & Neustadt, L.L.P.

(57) ABSTRACT

The present invention provides a method and apparatus for training a duration prediction model, method and apparatus for duration prediction, method and apparatus for speech synthesis. Said method for training a duration prediction model, comprising: generating an initial duration prediction model with a plurality of attributes related to duration prediction and at least part of possible attribute combinations of said plurality of attributes, in which each of said plurality of attributes and said attribute combinations is included as an item; calculating importance of each said item in said duration prediction model; deleting the item having the lowest importance calculated; re-generating a duration prediction model with the remaining items; determining whether said re-generated duration prediction model is an optimal model; and repeating said step of calculating importance and the following steps, if said duration prediction model is determined as not optimal model.

22 Claims, 4 Drawing Sheets

U.S. PATENT DOCUMENTS

| | | | |
|---|---|---|---|
| 2004/0088723 A1* | 5/2004 | Ma et al. | 725/19 |
| 2005/0182630 A1* | 8/2005 | Miro et al. | 704/269 |
| 2006/0229877 A1* | 10/2006 | Tian et al. | 704/267 |
| 2007/0239439 A1* | 10/2007 | Yi et al. | 704/219 |
| 2007/0239451 A1* | 10/2007 | Luan et al. | 704/246 |
| 2007/0276666 A1* | 11/2007 | Rosec et al. | 704/260 |
| 2008/0059163 A1* | 3/2008 | Ding et al. | 704/226 |
| 2008/0082331 A1* | 4/2008 | Luan et al. | 704/246 |
| 2009/0171660 A1* | 7/2009 | Jian et al. | 704/246 |

OTHER PUBLICATIONS

"Linguistic Factors Affecting Timing in Korean With Application to Speech Synthesis," Hyunsong Chung, et al., Department of Phonetics and Linguistics, University College London, U.K., 4 pages, Eurospeech 2001, 815-819.

"Modeling Vowel Duration for Japanese Text-To-Speech Synthesis," Jennifer J. Venditti, et al, Bell Labs—Lucent Technologies, Ohio State University, 4 pages, ICSLP 1998, pp. 786-789.

* cited by examiner

DURATION PREDICTION MODELING IN SPEECH SYNTHESIS

TECHNICAL FIELD

The invention relates to information processing technology, specifically, to the technology of training a duration prediction model with a computer, the technology of duration prediction and the technology of speech synthesis.

TECHNICAL BACKGROUND

Duration model predicts the reasonable duration of speech units according to its linguistic and phonetic attributes. Prior traditional methods include SOP (Sum of Products), CART (Classify and Regression Tree) and ANN (Artificial Neural Networks).

The Sum of Products (SOP) has been described in detail, for example, in the article "An RNN-based prosodic information synthesizer for Mandarin text-to-speech", S. H. Chen, S. H. Hwang et al, IEEE trans. Speech Audio Processing, Vol. 6, No. 3, pp 226-239, 1998, and in the article "Polynomial regression model for duration prediction in Mandarin", Sun Lu, Yu Hu, Ren-Hua Wang, INTERSPEECH-2004, pp 769-77.

The Classify and Regression Tree (CART) has been described in detail, for example, in the article "Linguistic factors affecting timing in Korean with application to speech synthesis", Chung, H. and Huckvale, M. A., Proceedings of Eurospeech 2001, Aalborg, vol. 2, pp. 815-819.

The Artificial Neural Networks (ANN) has been described in detail, for example, in the article "Modeling vowel duration for Japanese text-to-speech synthesis", Venditti, Jennifer J., Santen, Jan P. H. van, ICSLP-1998, pp. 786-789. All of which are incorporated herein by reference.

However, the traditional methods have following shortcomings:

1) The traditional methods are assailed by two main problems, data sparsity and attributes interaction. These are mainly caused by the imbalance between model complexity and database size. The existing models' coefficients can be computed by the data driven method. But the attributes and attributes combinations are selected manually instead of being selected by data driven method. So these "partially" data driven modeling methods depend on subjective empiricism.

2) Speaking rate is not introduced as an attribute for duration modeling. But segmental duration is obviously affected by speaking rate from the existing prosody researches. Thus, speech synthesizer has no choice but to linearly shorten or lengthen the segmental durations when users need to adjust speaking rate. But in fact, effects of different attributes on segmental durations differ widely, so it's not reasonable to do linear shortening and lengthening.

SUMMARY OF THE INVENTION

In order to solve the above problems in the prior art, the present invention provides a method and apparatus for training a duration prediction model, method and apparatus for duration prediction, method and apparatus for speech synthesis.

According to one aspect of the invention, there is provided a method for training a duration prediction model, comprising: generating an initial duration prediction model with a plurality of attributes related to duration prediction and at least part of possible attribute combinations of said plurality of attributes, in which each of said plurality of attributes and said attribute combinations is included as an item; calculating importance of each said item in said duration prediction model; deleting the item having the lowest importance calculated; re-generating a duration prediction model with the remaining items; determining whether said re-generated duration prediction model is an optimal model; and repeating said step of calculating importance and the steps following said step of calculating importance with the newly re-generated duration prediction model, if said duration prediction model is determined as not optimal model.

According to another aspect of the invention, there is provided a method for duration prediction, comprising: training a duration prediction model using said method for training a duration prediction model; obtaining corresponding values of said plurality of attributes related to duration prediction; and calculating the duration based on said duration prediction model trained.

According to another aspect of the invention, there is provided a method for speech synthesis, comprising: predicting durations using said method for duration prediction; and performing speech synthesis based on the durations predicted.

According to another aspect of the invention, there is provided an apparatus for training a duration prediction model, comprising: an initial model generator configured to generate an initial duration prediction model with a plurality of attributes related to duration prediction and at least part of possible attribute combinations of said plurality of attributes, in which each of said plurality of attributes and said attribute combinations is included as an item; an importance calculator configured to calculate importance of each said item in said duration prediction model; an item deleting unit configured to delete the item having the lowest importance calculated; a model re-generator configured to re-generate a duration prediction model with the remaining items after the deletion of said item deleting unit; and an optimization determining unit configured to determine whether said duration prediction model re-generated by said model re-generator is an optimal model.

According to another aspect of the invention, there is provided an apparatus for duration prediction, comprising: a duration prediction model that is trained by using said method for training a duration prediction model; an attribute obtaining unit configured to obtain corresponding values of said plurality of attributes related to duration prediction; and a duration calculator configured to calculate the duration based on said duration prediction model.

According to another aspect of the invention, there is provided an apparatus for speech synthesis, comprising: said apparatus for duration prediction; and said apparatus for speech synthesis is configured to perform speech synthesis based on the durations predicted.

BRIEF DESCRIPTION OF THE DRAWINGS

It is believed that the above features, advantages and objectives of the invention will be better understood through the following description of the implementations of the invention in conjunction with the accompany drawings, in which.

DETAILED DESCRIPTION OF THE INVENTION

In order to facilitate the understanding of the following embodiments, firstly we briefly introduce GLM (Generalized Linear Model) model and BIC (Bayes Information Criterion). GLM model is a generalization of multivariate regression model, while SOP is a special case of GLM. The GLM model predicts the duration $\hat{d}$ from attributes A of speech unit s by $$d_i = \hat{d}_i + e_i \quad (1)$$
$$= h^{-1}\left(\beta_0 + \sum_{j=1}^{p} \beta_j f_j(A)\right) + e_i$$

Where h is a link function, $(\beta_0, \beta_j \ldots \beta_p)$ is a vector of regression coefficients, $f_j(A)$ is a transform function of attributes vector A, $e_i$ is a predicated error and p is a dimension of the vector of regression coefficients. In general, it is assumed that the distribution of d is of exponential family. Using different link functions, we can get different exponential distributions of d. The GLM model of this embodiment assumes that the duration distribution is a Gaussian distribution. GLM can be used as either linear model or non-linear model.

A criterion is needed for comparing the performance of different models. The simpler a model is, the more reliable predict result for outlier data, while the more complex a model is, the more accurate prediction for training data. The BIC criterion is a widely used evaluation criterion, which gives a measurement integrating both the precision and the reliability and is defined by:

$$BIC = N \log(SSE/N) + p \log N \quad (2)$$

Where SSE is sum square of prediction errors. The first part of right side of the equation 2 indicates the precision of the model and the second part indicates the penalty for the model complexity. When the number of training sample N is fixed, the more complex the model is, the larger the dimension p is, the more precise the model can predict for training data, and the smaller the SSE is. So the first part will be smaller while the second part will be larger, vice versa. The increase of one part will lead to the decrease of the other part. When the summation of the two parts is the minimum, the model is optimal. BIC may get a good balance between model complexity and database size, this helps to overcome the data sparsity and attributes interaction problem.

Next, a detailed description of the preferred embodiments of the present invention will be given in conjunction with the accompany drawings.

Figure 1:
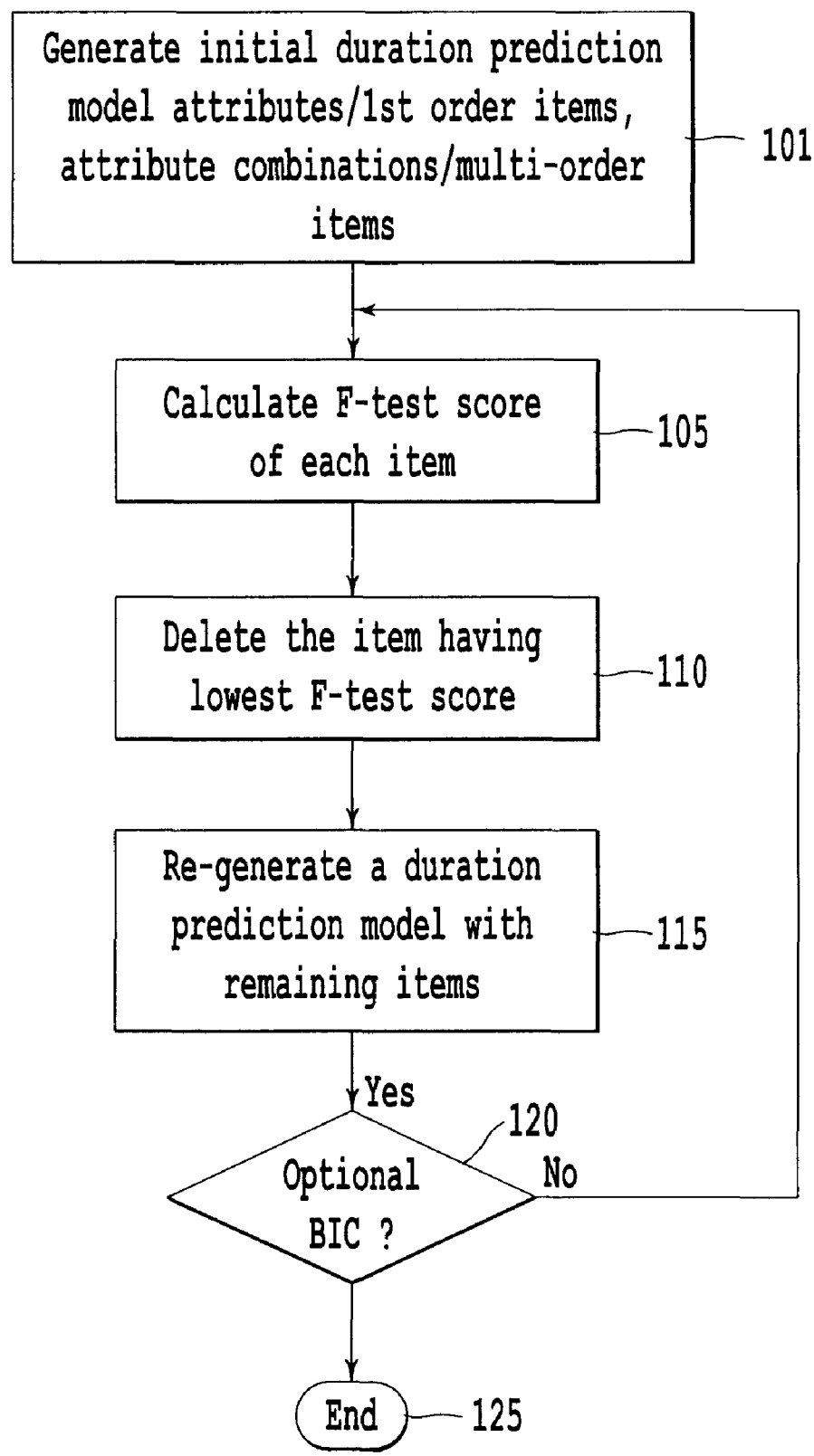
FIG. 1 is a flowchart of the method for training a duration prediction model according to one embodiment of the present invention.

FIG. 1 is a flowchart of the method for training a duration prediction model according to one embodiment of the present invention. The duration prediction model trained by the method of this embodiment will be used in the method for duration prediction and the method and apparatus for speech synthesis described later in conjunction with other embodiments.

As shown in FIG. 1, first at Step 101, an initial duration prediction model is generated. Specifically, the initial duration prediction model is generated with a plurality of attributes related to duration prediction and the combination of these attributes. As mentioned above, there are many attributes related to duration prediction, they can be roughly divided into attributes of language type and attributes of speech type. Table 1 exemplarily lists some attributes that may be used as attributes related to duration prediction.

TABLE 1 attributes related to duration prediction

| Attribute | Description |
| --- | --- |
| Pho | current phoneme |
| ClosePho | another phoneme in the same syllable |
| PrePho | the neighboring phoneme in the previous syllable |
| NextPho | the neighboring phoneme in the next syllable |
| Tone | Tone of the current syllable |
| PreTone | Tone of the previous syllable |
| NextTone | Tone of the next syllable |
| POS | Part of speech |
| DisNP | Distance to the next pause |
| DisPP | Distance to the previous pause |
| PosWord | Phoneme position in the lexical word |
| ConWordL | Length of the current, previous and next lexical word |
| SNumW | Number of syllables in the lexical word |
| SPosSen | Syllable position in the sentence |
| WNumSen | Number of lexical words in the sentence |
| SpRate | Speaking rate |

In this embodiment, GLM model is used to represent these attributes and attributes combinations. To facilitate explanation, it is assumed that only phone and tone are attributes related to duration prediction. The form of the initial duration prediction model is as follows: duration~phone+tone+tone*phone, wherein tone*phone means the combination of tone and phone, which is a 2nd order item.

It is appreciated that as the number of attribute increases, there may appear a plurality of 2nd order items, 3rd order items and so on as a result of attribute combination.

In addition, in this embodiment, when the initial duration prediction model is generated, only a part of attribute combinations may be kept, for instance, only those combinations of up to 2nd order are kept; of course, it is possible to keep combinations of up to 3rd order or to add all attribute combinations into the initial duration prediction model.

In a word, the initial duration prediction model includes all independent attributes (1st order items) and at least part of attribute combinations (2nd order items or multi-order items). Thus, the initial duration prediction model can be automatically generated by using simple rules instead of being set manually based on empiricism as prior art does.

Next, at Step 105, importance of each item is calculated with F-test. As a well known standard statistical method, F-test has been described in detailed in PROBABILITY AND STATISTICS by Sheng Zhou, Xie Shiqian and Pan Shengyi (2000, Second Edition, Higher Education Press), it will not be repeated here.

It should be noted that though F-test is used in this embodiment, other statistical methods such as Chisq-test and so on may also be used.

Next, at Step 110, the item having the lowest score of F-test is deleted from the initial duration prediction model. Then, at Step 115, a duration prediction model is re-generated with the remaining items.

Next, at Step 120, BIC value of the re-generated duration prediction model is calculated, and the above-mentioned method is used to determine whether the model is an optimal model. If the determination at Step 120 is "Yes", then the newly generated duration prediction model is taken as an optimal model and the process ends at Step 125.

If the determination at Step 120 is "No", then the process returns to Step 105, the importance of each item of the re-generated model is re-calculated, the unimportant items are deleted (Step 110) and a model is re-generated (Step 115) until an optimal model is obtained.

From the above description it can be seen that the present embodiment selects attribute with a Generalized Linear Model (GLM) based duration modeling method and a F-test and Bayes Information Criterion (BIC) based stepwise regression method. Since the structure of the GLM model of the present embodiment is flexible, it easily adapts to the size of the training database, so that the problem of data sparsity is solved. Further, the important attribute interaction items can be selected automatically with the stepwise regression method.

In addition, in the method for training a duration prediction model according to one preferred embodiment of the present invention, speaking rate is also adopted as one of a plurality of attributes related to duration prediction. Since speaking rate is introduced into duration prediction modeling, a new approach is provided to adjust speaking rate for speech synthesis. Before speech is outputted by a speech synthesis system, the speaking rate may be specified by a user or an application; the speaking rate in the database is also fixed. So the speaking rate is known for both training and testing of the duration prediction model. The attribute collection of a duration prediction model not only can introduce speaking rate itself, but also can introduce items that interacts with the speaking rate to improve the precision of duration prediction. During the process of speech synthesis, speaking rate based duration prediction can also improve the simple linear lengthening or shortening speaking rate adjusting method. Some researches indicates that the effect of speaking rate on duration is different from phoneme to phoneme, this also indicates that speaking rate does interact with other attributes.

Figure 2:
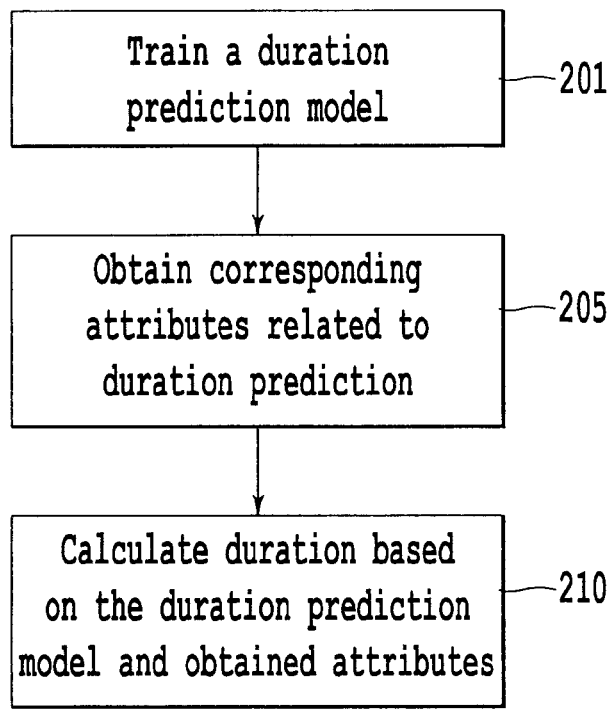
FIG. 2 is a flowchart of the method for duration prediction according to one embodiment of the present invention.

Under the same inventive conception, FIG. 2 is a flowchart of the method for duration prediction according to one embodiment of the present invention. Next, the present embodiment will be described in conjunction with FIG. 2. For those same parts as the above embodiments, the description of which will be appropriately omitted.

As shown in FIG. 2, first at Step 201, a duration prediction model is trained by using the method for training a duration prediction model described in the above embodiment.

Next, at Step 205, corresponding values of the plurality of attributes related to duration prediction are obtained. Specifically, for instance, they can be obtained directly from inputted text, or obtained via grammatical and syntactic analysis. It should be noted that the present embodiment can employ any known or future method to obtain these corresponding attributes and is not limited to a particular manner, and the obtaining manner also corresponds to the selection of the attributes.

Finally, at Step 210, the duration is calculated based on the trained duration prediction model and the above obtained attributes.

From the above description it can be seen that since the method for duration prediction of the present embodiment employs a model trained by the method for training a duration prediction model of the above embodiments to predict duration, it easily adapts to the size of the training database, so that the problem of data sparsity is solved and the important attribute interaction items can be automatically selected. Therefore, the method for duration prediction of the present embodiment can more accurately and automatically predict duration.

In addition, in the method for duration prediction according to one preferred embodiment of the present invention, speaking rate is also adopted as one of a plurality of attributes related to duration prediction. Thus, by introducing speaking rate into duration prediction modeling, the attribute collection of a duration prediction model not only can introduce speaking rate itself, but also can introduce items that interacts with the speaking rate, thereby the precision of duration prediction can be further improved.

Figure 3:
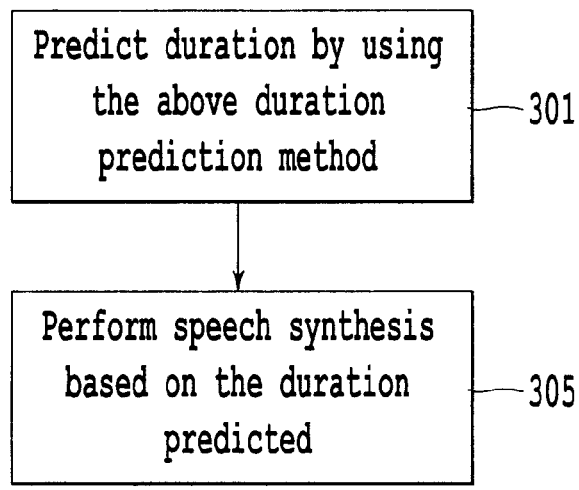
FIG. 3 is a flowchart of the method for speech synthesis according to one embodiment of the present invention.

Under the same inventive conception, FIG. 3 is a flowchart of the method for speech synthesis according to one embodiment of the present invention. Next, the present embodiment will be described in conjunction with FIG. 3. For those same parts as the above embodiments, the description of which will be appropriately omitted.

As shown in FIG. 3, first at Step 301, duration is predicted by using the method for duration prediction described in the above embodiments.

Then, at Step 305, speech synthesis is performed based on the duration predicted.

From the above description it can be seen that since the method for speech synthesis of the present embodiment employs the method for duration prediction of the above embodiments to predict duration and performs speech synthesis based on the predicted result, it easily adapts to the size of the training database, so that the problem of data sparsity is solved and the important attribute interaction items can be automatically selected. Therefore, the method for speech synthesis of the present embodiment can more accurately and automatically perform speech synthesis, and the speech generated will be more reasonable and understandable.

In addition, in the method for speech synthesis according to one preferred embodiment of the present invention, speaking rate is also adopted as one of a plurality of attributes related to duration prediction. Since speaking rate is introduced into duration prediction modeling, a new approach is provided to adjust speaking rate for speech synthesis. Before speech is outputted by a speech synthesis system, the speaking rate may be specified by a user or an application; the speaking rate in the database is also fixed. So the speaking rate is known for both training and testing of the duration prediction model. The attribute collection of a duration prediction model not only can introduce speaking rate itself, but also can introduce items that interacts with the speaking rate to improve the precision of duration prediction. During the process of speech synthesis, speaking rate based duration prediction can also improve the simple linear lengthening or shortening speaking rate adjusting method. Some researches indicates that the effect of speaking rate on duration is different from phoneme to phoneme, this also indicates that speaking rate does interact with other attributes.

Figure 4:
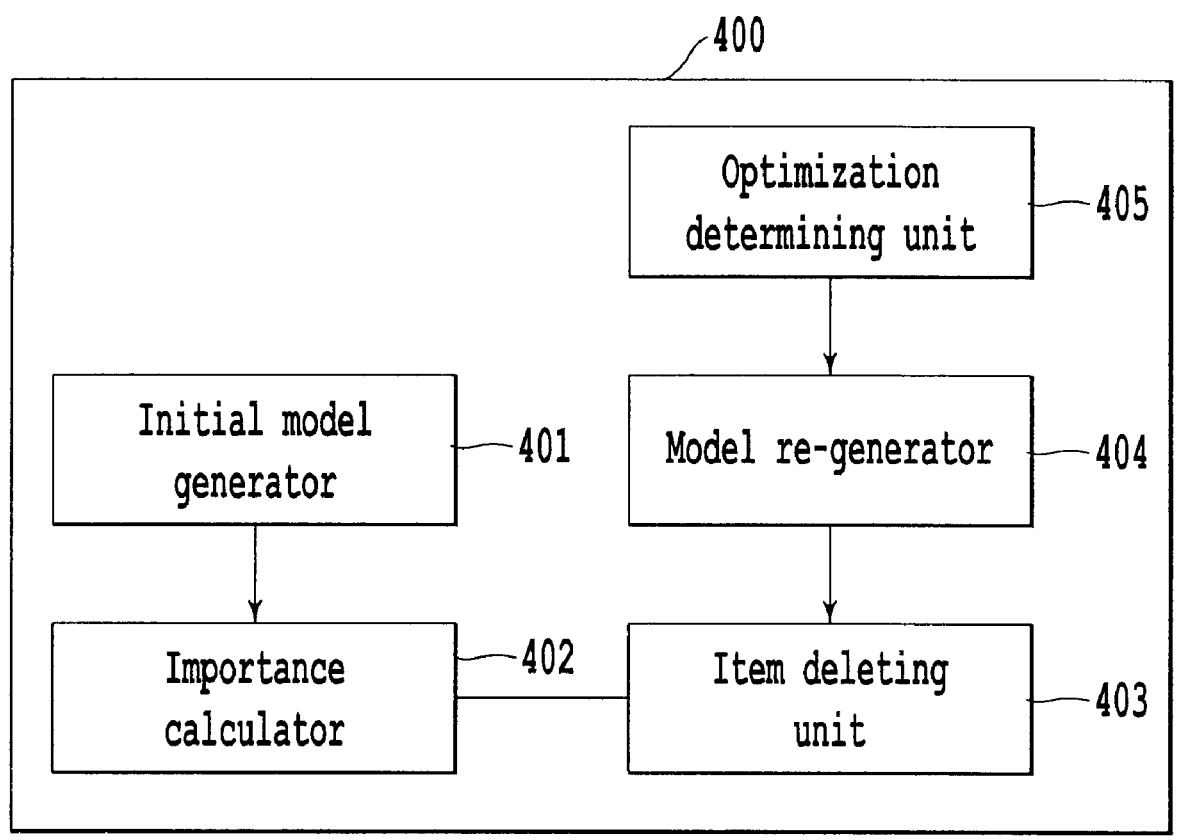
FIG. 4 is a block diagram of the apparatus for training a duration prediction model according to one embodiment of the present invention.

Under the same inventive conception, FIG. 4 is a block diagram of the apparatus for training a duration prediction model according to one embodiment of the present invention. Next, the present embodiment will be described in conjunction with FIG. 4. For those same parts as the above embodiments, the description of which will be appropriately omitted.

As shown in FIG. 4, the apparatus 400 for training a duration prediction model of the present embodiment comprising: an initial model generator 401 configured to generate an initial duration prediction model with a plurality of attributes related to duration prediction and at least part of possible attribute combinations of said plurality of attributes, in which each of said plurality of attributes and said attribute combinations is included as an item; an importance calculator 402 configured to calculate importance of each said item in said duration prediction model; an item deleting unit 403 configured to delete the item having the lowest importance calculated; a model re-generator 404 configured to re-generate a duration prediction model with the remaining items after the deletion of item deleting unit 403; and an optimization determining unit 405 configured to determine whether the duration prediction model re-generated by model re-generator 404 is an optimal model.

Same to the above-described embodiments, the plurality of attributes related to duration prediction in the present embodiment comprise: attributes of language type and attributes of speech type, for instance, comprise: any number of attributes selected from the above Table 1.

Wherein, the importance calculator 402 calculates the importance of each item with F-test. The optimization determining unit 405 determines whether said re-generated duration prediction model is an optimal model based on Bayes Information Criterion (BIC).

In addition, according to one preferred embodiment of the invention, said at least part of attribute combinations comprise all the 2nd order attribute combinations of said plurality of attributes related to duration prediction.

In addition, according to another preferred embodiment of the invention, said plurality of attributes related to duration prediction comprise speaking rate.

Here, it should be noted that the apparatus 400 for training a duration prediction model and its respective components in the present embodiment can be constructed with a specialized circuit or chip or be implemented by a computer (processor) executing a corresponding program. Also, the apparatus 400 for training a duration prediction model in the present embodiment may operationally implement the method for training a duration prediction model in the above embodiments.

Figure 5:
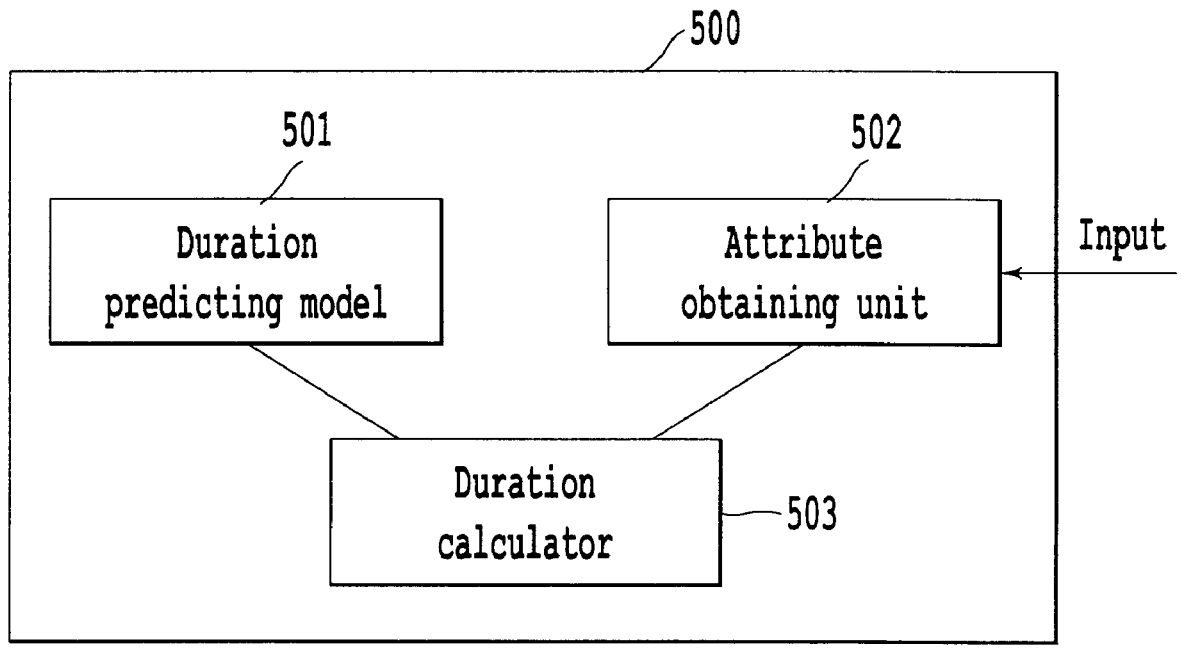
FIG. 5 is a block diagram of the apparatus for duration prediction according to one embodiment of the present invention.

Under the same inventive conception, FIG. 5 is a block diagram of the apparatus for duration prediction according to one embodiment of the present invention. Next, the present embodiment will be described in conjunction with FIG. 5. For those same parts as the above embodiments, the description of which will be appropriately omitted.

As shown in FIG. 5, the apparatus 500 for duration prediction of the present embodiment comprises: a duration predicting model 501, which is a duration prediction model trained by using the method for training a duration prediction model described in the above embodiments; an attribute obtaining unit 502 configured to obtain corresponding values of the plurality of attributes related to duration prediction; and a duration calculator 503 configured to calculate the duration based on the duration predicting model 501 and the corresponding values of the plurality of attributes related to duration prediction obtained by the attribute obtaining unit 502.

Here, for the manner to obtain attributes, as described in the above embodiments, any known or future methods can be used to obtain these corresponding attributes and it is not limited to a particular manner, and the obtaining manner also relates to the selection of attributes. For instance, obtaining the attributes of phone and tone can be performed based on the spelling after text analysis (word segmentation); obtaining the attributes of grammar types can be performed by a grammar analyzer or a syntactic analyzer.

Figure 6:
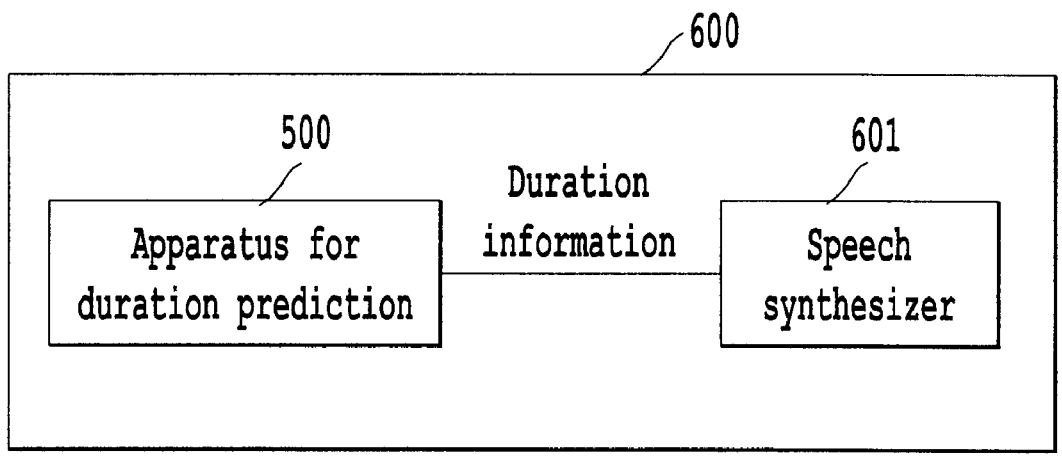
FIG. 6 is a block diagram of the apparatus for speech synthesis according to one embodiment of the present invention.

Under the same inventive conception, FIG. 6 is a block diagram of the apparatus for speech synthesis according to one embodiment of the present invention. Next, the present embodiment will be described in conjunction with FIG. 6. For those same parts as the above embodiments, the description of which will be appropriately omitted.

As shown in FIG. 6, the apparatus 600 for speech synthesis of the present embodiment comprises: an apparatus 500 for duration prediction, which can be the apparatus for duration prediction described in the above embodiment; and a speech synthesizer 601, which may be a prior art speech synthesizer, configured to perform speech synthesis based on the durations predicted by the above apparatus for duration prediction.

Here, it should be noted that the apparatus 600 for speech synthesis and its respective components in the present embodiment may be constructed with a specialized circuit or chip or be implemented by a computer (processor) executing a corresponding program. Also, the apparatus 600 for speech synthesis of the present embodiment may operationally implement the method for speech synthesis in the above embodiments.

Though a method and apparatus for training a duration prediction model, method and apparatus for duration prediction, method and apparatus for speech synthesis have been described in details with some exemplary embodiments, these embodiments are not exhaustive. Those skilled in the art may make various variations and modifications within the spirit and scope of the present invention. Therefore, the present invention is not limited to these embodiments; rather, the scope of the present invention is only defined by the appended claims.

The invention claimed is:

1. A method for training a duration prediction model, comprising:

generating an initial duration prediction model with a plurality of attributes related to duration prediction and at least part of possible attribute combinations of said plurality of attributes, in which each of said plurality of attributes and said attribute combinations is included as an item;

calculating importance of each item in said duration prediction model with a computer processor;

deleting the item having a lowest importance calculated;

re-generating a duration prediction model with remaining items;

determining whether said re-generated duration prediction model is an optimal model; and repeating said step of calculating importance and the steps following said step of calculating importance with a newly re-generated duration prediction model, if said duration prediction model is determined as not an optimal model.

2. The method for training a duration prediction model according to claim 1, wherein said plurality of attributes related to duration prediction include: attributes of language type and speech type.

3. The method for training a duration prediction model according to claim 1, wherein said plurality of attributes related to duration prediction include: any selected from current phoneme, another phoneme in a same syllable, neighboring phoneme in a previous syllable, neighboring phoneme in a next syllable, tone of a current syllable, tone of the previous syllable, tone of the next syllable, part of speech, distance to a next pause, distance to a previous pause, phoneme position in a lexical word, length of a current, previous and next lexical word, number of syllables in the lexical word, syllable position in a sentence, and number of lexical words in the sentence.

4. The method for training a duration prediction model according to claim 1, wherein said duration prediction model is a Generalized Linear Model (GLM).

5. The method for training a duration prediction model according to claim 1, wherein said at least part of possible attribute combinations of said plurality of attributes include all 2nd order attribute combinations of said plurality of attributes related to duration prediction.

6. The method for training a duration prediction model according to claim 1, wherein said step of calculating importance of each item in said duration prediction model includes calculating the importance of each said item with F-test.

7. The method for training a duration prediction model according to claim 1, wherein said step of determining whether said re-generated duration prediction model is an optimal model includes determining whether said re-generated duration prediction model is an optimal model based on Bayes Information Criterion (BIC).

8. The method for training a duration prediction model according to claim 7, wherein said step of determining whether said re-generated duration prediction model is an optimal model includes
calculating based on an equation $$BIC = N \log(SSE/N) + p \log N,$$

wherein SSE represents sum square of prediction errors and N represents a number of training sample; and
determining said re-generated duration prediction model as an optimal model, when the BIC is a minimum.

9. The method for training a duration prediction model according to any one of the preceding claims, wherein said plurality of attributes related to duration prediction further include speaking rate.

10. The method for training a duration prediction model according to claim 1, further comprising:
obtaining corresponding values of said plurality of attributes related to duration prediction; and
calculating a duration based on said duration prediction model and said corresponding values of said plurality of attributes related to duration prediction.

11. The method for training a duration prediction model according to claim 10, wherein said plurality of attributes related to duration prediction include speaking rate.

12. The method for training a duration prediction model according to any one of claims 10-11, further comprising:
performing speech synthesis based on the durations predicted.

13. An apparatus for training a duration prediction model, comprising:
an initial model generator configured to generate an initial duration prediction model with a plurality of attributes related to duration prediction and at least part of possible attribute combinations of said plurality of attributes, in which each of said plurality of attributes and said attribute combinations is included as an item;
an importance calculator configured to calculate importance of each said item in said duration prediction model;

an item deleting unit configured to delete the item having a lowest importance calculated;
a model re-generator configured to re-generate a duration prediction model with remaining items after a deletion of said item deleting unit; and
an optimization determining unit configured to determine whether said duration prediction model re-generated by said model re-generator is an optimal model.

14. The apparatus for training a duration prediction model according to claim 13, wherein said plurality of attributes related to duration prediction include: attributes of language type and speech type.

15. The apparatus for training a duration prediction model according to claim 13, wherein said plurality of attributes related to duration prediction include: any selected from current phoneme, another phoneme in a same syllable, neighboring phoneme in a previous syllable, neighboring phoneme in a next syllable, tone of a current syllable, tone of the previous syllable, tone of the next syllable, part of speech, distance to a next pause, distance to a previous pause, phoneme position in a lexical word, length of a current, previous and next lexical word, number of syllables in the lexical word, syllable position in a sentence, and number of lexical words in the sentence.

16. The apparatus for training a duration prediction model according to claim 13, wherein said at least part of possible attribute combinations of said plurality of attributes include all 2nd order attribute combinations of said plurality of attributes related to duration prediction.

17. The apparatus for training a duration prediction model according to claim 13, wherein said importance calculator is configured to calculate the importance of each said item with F-test.

18. The apparatus for training a duration prediction model according to claim 13, wherein said optimization determining unit is configured to determine whether said re-generated duration prediction model is an optimal model based on Bayes Information Criterion (BIC).

19. The apparatus for training a duration prediction model according to any one of claims 13-18, wherein said plurality of attributes related to duration prediction further include speaking rate.

20. The apparatus for training a duration prediction model according to claim 13, further comprising:
an attribute obtaining unit configured to obtain corresponding values of said plurality of attributes related to duration prediction; and
a duration calculator configured to calculate a duration based on said duration prediction model and said corresponding values of said plurality of attributes related to duration prediction.

21. The apparatus for training a duration prediction model according to claim 20, wherein said plurality of attributes related to duration prediction include speaking rate.

22. The apparatus for training a duration prediction model according to any one of claims 20-21, wherein the apparatus for training a duration prediction model is included in an apparatus for speech synthesis configured to perform speech synthesis based on the durations predicted.

* * * * *